United States Patent
Palm et al.

[11] 3,889,935
[45] June 17, 1975

[54] VEHICLE BODY HEIGHT CONTROL VALVE

[75] Inventors: Walter C. Palm, Grand Rapids, Mich.; James E. Lyon, Perrysburg, Ohio

[73] Assignee: Midland-Ross Corporation, Cleveland, Ohio

[22] Filed: Jan. 23, 1974

[21] Appl. No.: 435,671

[52] U.S. Cl. ............................. 267/65 D; 267/64 R
[51] Int. Cl. ............................................. F16f 9/34
[58] Field of Search ............. 267/65 D, 65 R, 64 R

[56] References Cited
UNITED STATES PATENTS

| | | | |
|---|---|---|---|
| 3,018,798 | 1/1962 | Bowlus | 267/65 D |
| 3,048,193 | 8/1962 | Cislo | 267/65 D |
| 3,059,918 | 10/1962 | Pribonic | 267/65 D |
| 3,635,460 | 1/1972 | Shilton et al | 267/65 D |

Primary Examiner—James B. Marbert
Attorney, Agent, or Firm—Woodrow Portz

[57] ABSTRACT

Described herein is a valve, referred to herein as a height control valve, mechanically interposed between the sprung and unsprung portions of a vehicle, and communicatively interposed in a fluid conducting system to place a fluid-operated suspension spring of the vehicle in isolation, or in communication under alternate conditions with a source of fluid under pressure, or an exhaust region. The valve comprises time-delay mechanism for delaying valve response to instantaneous variations in the spacing of the sprung and unsprung portions until a definite trend of spacing is established over a predetermined time period. The improvement disclosed is structure for adjusting the time-delay mechanism to effect changes in the period of valve response.

9 Claims, 9 Drawing Figures

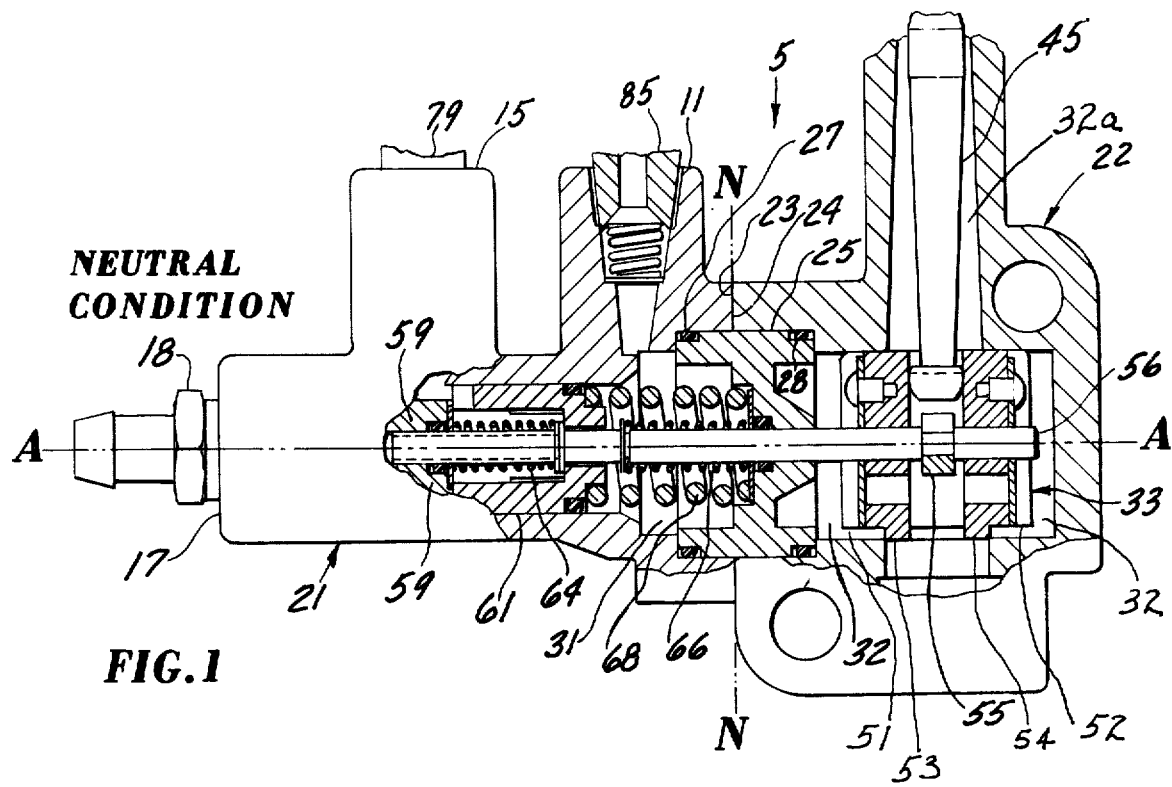
FIG. 1 NEUTRAL CONDITION
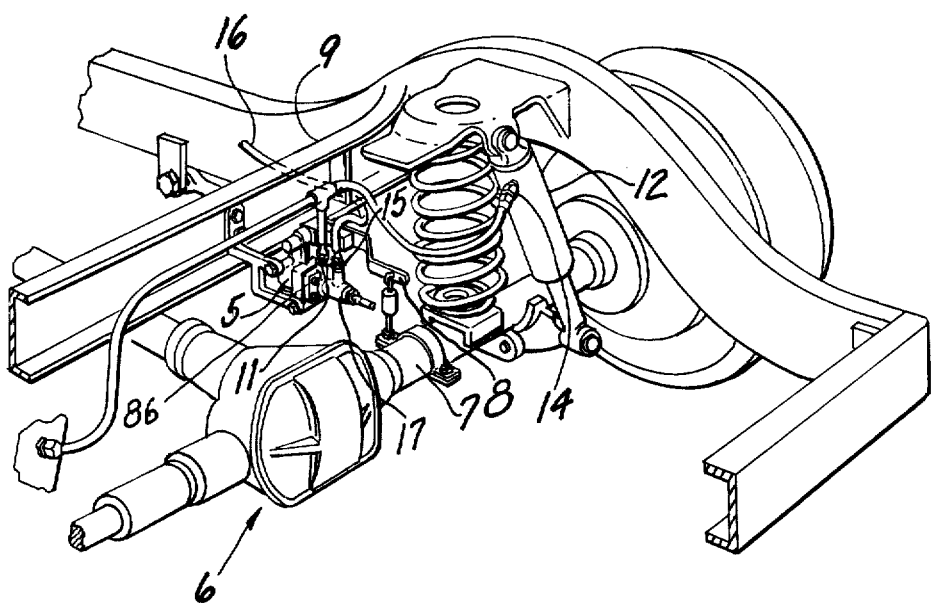
FIG. 2

EXHAUST CONDITION

SUPPLY CONDITION

VEHICLE BODY HEIGHT CONTROL VALVE

BACKGROUND OF THE INVENTION

This invention is concerned with height control valves of the type confining axially tandem tappet valve construction in tandem axial relation with double acting dashpot mechanism. Height control valves of this general type are known, e.g., through U.S. Pat. No. 3,635,460. Such prior art types however lack adjustability of parts such as will permit changes in the operation of a height control valve. Any such changes must be obtained through changes in shapes of parts, flow controlling orifices, or the viscosity of dashpot dampening liquids. Moreover, the prior art types have been found unduly complicated in design and difficult to assemble.

Hence, a major object of this invention is to provide a height control valve constructed with relatively adjustable parts enabling variation in the period of time-delay for response of the valve to demands made thereon for increased or decreased pressures in fluid actuated springs connected therewith.

Another object is to provide the above indicated type of valve in a form that is easier to manufacture and to assemble than valves of the general type noted above from the prior art.

SUMMARY OF THE INVENTION

The present invention resides in a height control valve connected between, and with, an air reservoir tank or other source of fluid under pressure, and a fluid operated spring such as the well known air assisted hydraulic shock absorber. For simplicity in description, these devices will hereinafter be referred to as "air springs." The valve is mounted to respond to changes of spacing between sprung and unsprung portions of a vehicle to supply fluid to the spring, to let fluid flow out of the spring, or to isolate the spring from any gain or loss in fluid. As structural improvements arising out of the invention, the valve comprises a housing having an elongate chamber of circular cross section, and a valve assembly which controls the passage of fluid through the valve which is structurally independent of other portions of the valve and movable as a unit along with an actuating rod by adjustable thrust means lengthwise of the chamber in opposition to a spring having a fixed seat. The position of the assembly and the actuating rod extending therefrom into lost-motion relation with the time-delay mechanism is thereby changed to change the period in which the time-delay mechanism will act on the rod and the valve assembly to effect valving action.

In a preferred embodiment, the housing of the valve is divisible along surfaces which extend transversely to the axis of the chamber and divide the housing into two portions which separately house the time-delay mechanism and the valving mechanism. In a more refined form of the invention, the housing portions are axially recessed adjacent their abutting surfaces to receive a coupling bushing serving to assure coaxial alignment of the housing portions and sealed relation of the chamber with the atmosphere. The bushing advantageously provides a fixed seat for a spring which holds the valve assembly against a thrust means, such as an exhaust fitting, in threaded adjustable relation with the housing.

BRIEF DESCRIPTION OF THE DRAWING

FIG. 1 of the drawing is a fragmentary view with portions broken away along a vertical axial plane of the valve in its normal operative position and neutral operative condition;

FIG. 2 is a fragmentary perspective view illustrating the valve as mounted on a vehicle;

DESCRIPTION OF PREFERRED EMBODIMENT

Figure 3:
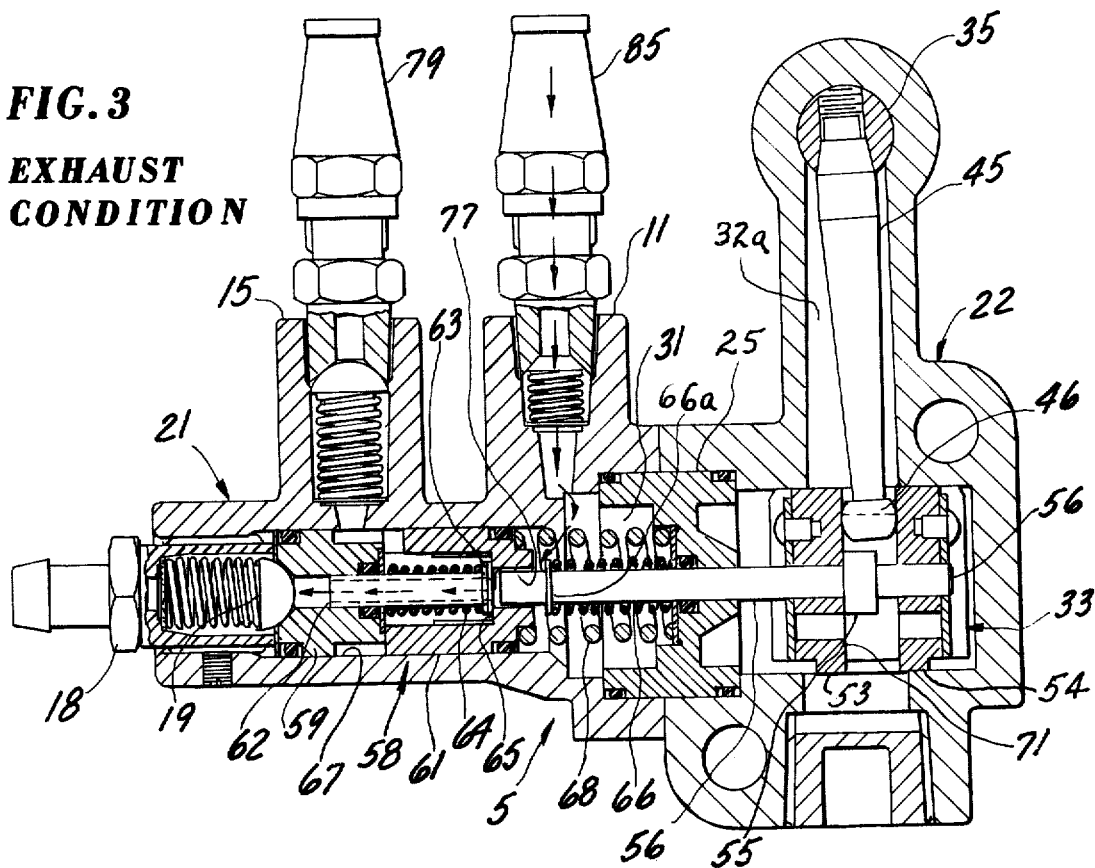
FIG. 3 is a fragmentary vertical sectional view somewhat similar to FIG. 1 showing the valve in an operative condition passing the fluid from its outlet port to its exhaust port.

The height control valve 5 of this invention is shown in FIG. 1 and in its normal use environment as mounted on a vehicle 6 in FIG. 2. In the manner shown by FIG. 2, the valve housing is attached to a sprung portion of the vehicle, i.e., the chassis frame 9 of the vehicle, and an exterior actuating lever 8 of the valve is attached to the unsprung portion, i.e., the axle 7. This invention contemplates that the connection of the valve with the vehicle portions may be reversed without affecting the function of the valve. The outlet port 11 of the valve 5 is connected to a fluid spring 12 which in this case is a well known device known as an "air shock" consisting essentially of a conventional hydraulic shock absorber having an air chamber superimposed thereon connected with the telescoping members of the shock absorber to expand or contract with extension or contraction of the shock absorber length. The outlet port 11 is shown connected with an inlet fitting 14 of the air chamber of the shock absorber. The supply port 15 of the valve 5 is connected by a line 16 to an air tank or other source of pressure fluid. The valve 5 may exhaust to the atmosphere through an exhaust port 17 within which is received a hollow fitting 18 housing a check valve 19 (see FIG. 3) oriented to permit air or other fluid entering the valve through the port 11 to pass from the valve.

Looking now to FIGS. 1 and 3-7 for details of the valve construction, its housing comprises portions 21, 22 having abutting end surfaces 23, 24 joining along a parting plane N—N. Both housing portions are formed with bores in end-to-end relationship and concentric relation with an axis A—A to form in this manner an elongate chamber of which sections thereof may vary in diameter. Both housing portions are axially recessed or counterbored from respective abutting surfaces 23, 24 to receive a coupling bushing 25. The bushing 25 is circumferentially recessed along its outer periphery at both ends to receive O-rings 27, 28 which seal the chamber from the atmosphere. The bushing 25 is preferably formed in close fitting relation with complementary surfaces of the housing portions as shown to maintain good coaxial alignment of respective portions of the elongate chamber.

Figure 4:
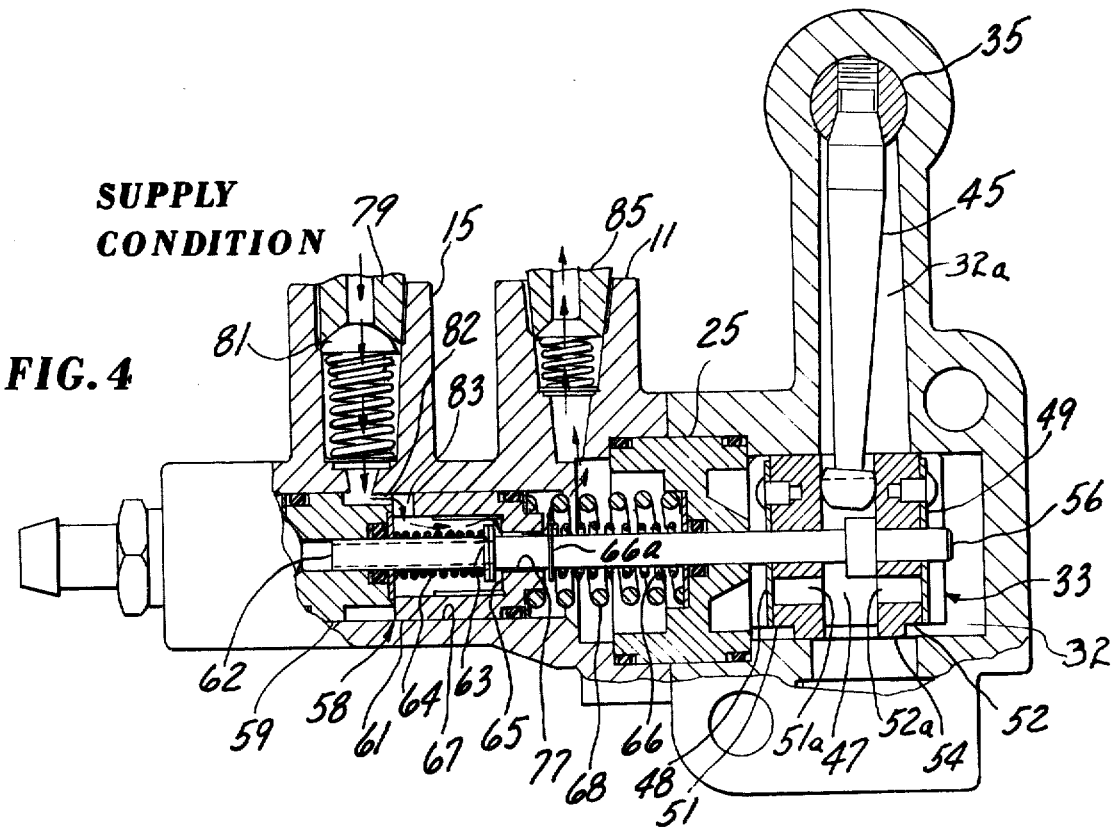
FIG. 4 is a vertical sectional view somewhat similar to FIG. 1 but showing the valve in an operative condition for passing a fluid from its supply port to its outlet port.

The bushing 25 has another important function, that of sealing the housing portions from each other and providing with its left face, as viewed in FIGS. 1, 3 and 4, the right extremity of an annular cavity 31 in communication with the outlet port 11. The right face of the bushing defines the leftward extremity of the cavity 32 for the dashpot mechanism housed generally within housing portion 22 and provides a stop for the leftward movement of the dashpot piston 33. Except for parts housed therein, cavity 32 and a region 32a contiguous therewith are filled with a viscous liquid.

The housing portion 22 houses and mounts what is termed generally a valve actuating mechanism of conventional design wherein relative motion of the vehicle portions initially received by the valve causes the lever 8 to swing about the axis P—P of a shaft 35 connected with the lever 8 to be rotated thereby by an overtravel mechanism housed within the lever housing 36. Such overtravel mechanism permits the lever 8 to be swung to a position relative to the shaft 35 in angular displacement with that shown in FIG. 7 wherein a movable follower 37 subjected to strong thrust forces from compressed spring 38, 39 confined between the follower and a fixed keeper 40, fully engages a flat or slight concaved diametral surface 41 of the shaft. The keeper is secured within the housing 36 by a bolt 42.

Valve function occurs as the result of loading the vehicle and the lever 8 shifting to a new average position to which the shaft 35 will tend to conform by a slow following or conforming movement of the shaft 35 permitted by the time-delaying dashpot mechanism housed within the cavity 32 until the diametral surface 41 and the follower are again in face-to-face contact. The resulting action on the valve mechanism described below and consequent expansion or contraction of the fluid spring will bring about the restoration of the original spacing of the vehicle portions and the original position of the lever which existed before additional loading or unloading occurred.

The dashpot mechanism is actuated from the shaft 35 by a radially extending arm 45 fixed to, and extending radially from, the shaft 35 and terminating in a ball 46 received by a diametrally extending square hole 47 extending centrally through the piston 33. The piston comprises flexible flapper or reed check valves 48,49 secured to opposite ends of the piston body over apertures 51a,52b, respectively. For quick return of the piston 33 to neutral position, the piston is flattened along areas 51,52 having adjacent full circle piston lands 53,54, respectively. The flattened areas 51,52 permit flow channels thereover permitting quick return of fluid from one end region to the central and opposite end regions of the cavity 32 until neutral position is reached. Movements from the neutral position cause one of the full circle lands 53 or 54, depending on the direction of movement, to act as a piston with the corresponding check valve 48 or 49 checking the flow of fluid from the region of entrapment adjacent the adjacent end of the piston. With the check valve closed, the time-delay function of the piston under the urging of the lever 45 is established by the slow escape of liquid through (1) the slight annular clearance between the full circle periphery of the piston and the cylindrical wall of cavity 32, and (2) the slight cylindrical clearance between the shaft 56 and the piston bore therefor.

The time-delay function results from the period of time during which the piston 33 moves from its neutral position to a position engaging a collar 55 in fixed axial attachment to an actuating rod 56 whereupon the rod 56 shifts to operate the valving mechanism by slight continuation of movement in the same direction. This function is characterized by movements which are relatively slow compared to return movements of the piston 33 to a neutral position.

The valving mechanism is housed essentially in housing portion 21 and comprises the portion of rod 56 extending through the bushing 25 and into portion 21, and a valve assembly 58 comprising a cartridge 59 and a sleeve 61 in end-to-end engagement having the same outer diameter and central bores, a tubular valve element 62 having a flange-like head 63 axially movable within the bore of the cartridge, a spring 64 seating on and extending between the cartridge and the head 63 urging the head against a gas impervious stop means, such as internal radial surface 65 of the sleeve surrounding a passageway 77, and a small spring 66 surrounding the rod 56 which seats on the bushing 25 and a seat element 66a fixed to the rod for urging it endwise against the tube 62. The spring 66 is weaker than the spring 64 in order that tube head 63 may seat against surface 65 in the neutral condition of the valve. Surface 65 faces toward the exhaust port and is arranged for a desired position of an abutment of the tube 62 and the rod 56.

The valve assembly just described is movable as a unit within a bore 67 of uniform diameter lengthwise toward and away from the bushing 25. The valve assembly is confined between the check valve fitting 18 and a spring 68 which seats at one end within a counterbore therefor in the left face of the bushing 25 and against a right fact of the sleeve 61. The spring 68 is large and strong enough to overcome any opposing action of any other springs in the valve. As an important feature of this invention, the valve assembly 58 is positioned between the spring on the one side and the fitting 18 on its other side with the axial position of the assembly being changeable by reason of the threaded relation of the fitting with the housing portion 21 and consequent rotatability of the fitting.

The major significance of adjusting the assembly 58 lengthwise of the bore 67 is to correspondingly change the axial position of the rod 56 and the collar 55 in fixed axial position thereon. To obtain such positioning, the rod 56 is constructed with a circumferential groove 69 (see FIG. 6) of the same width as the collar. The collar is of U-shape and formed, e.g., of central opening slightly smaller than the groove and comprises a stiff springy material, such as an organic polymeric resin, that causes the legs of the collar to tightly clamp the circumference of the rod within the groove.

Figure 5:
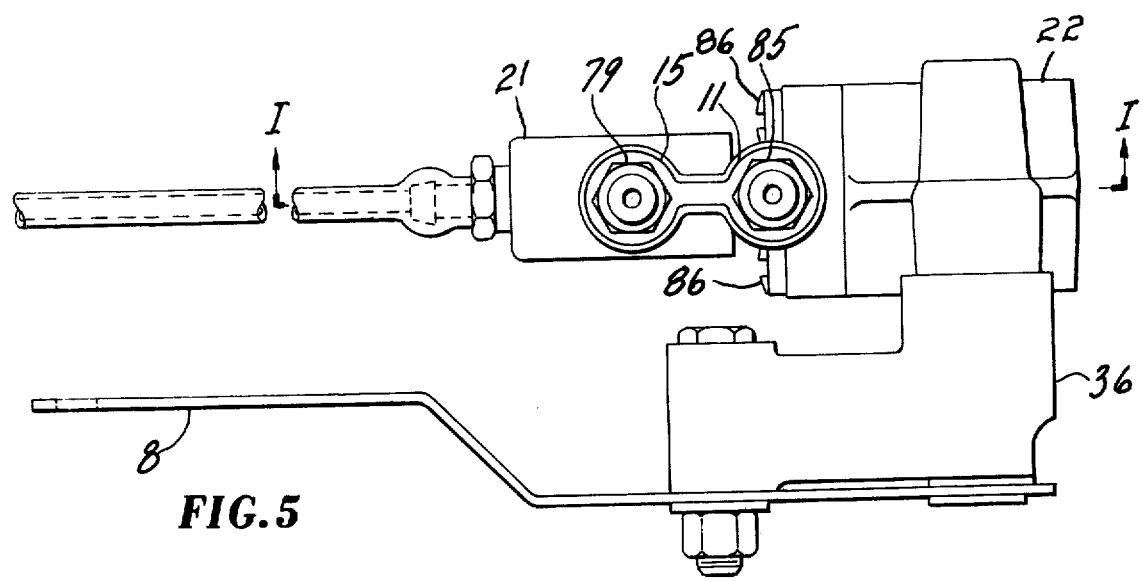
FIG. 5 is a plan view of the valve shown in previous figures.
Figure 6:
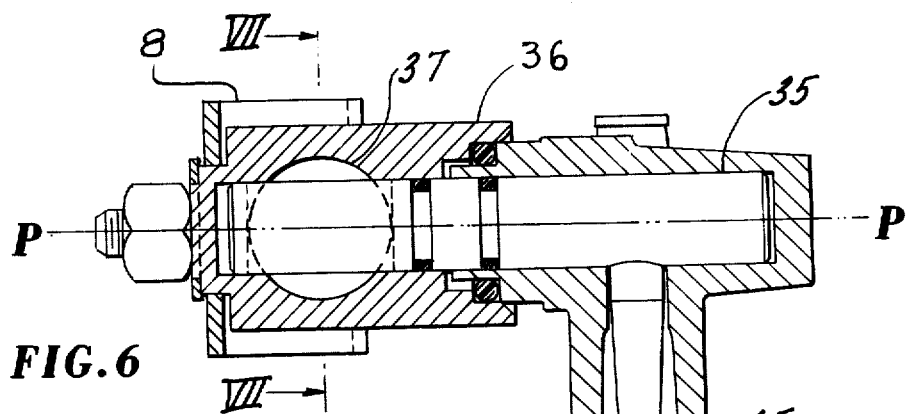
FIG. 6 is a section view taken along a vertical plane through the axis of a horizontal shaft of the valve actuating mechanism with the plane bisecting the time-delay mechanism.
Figure 7:
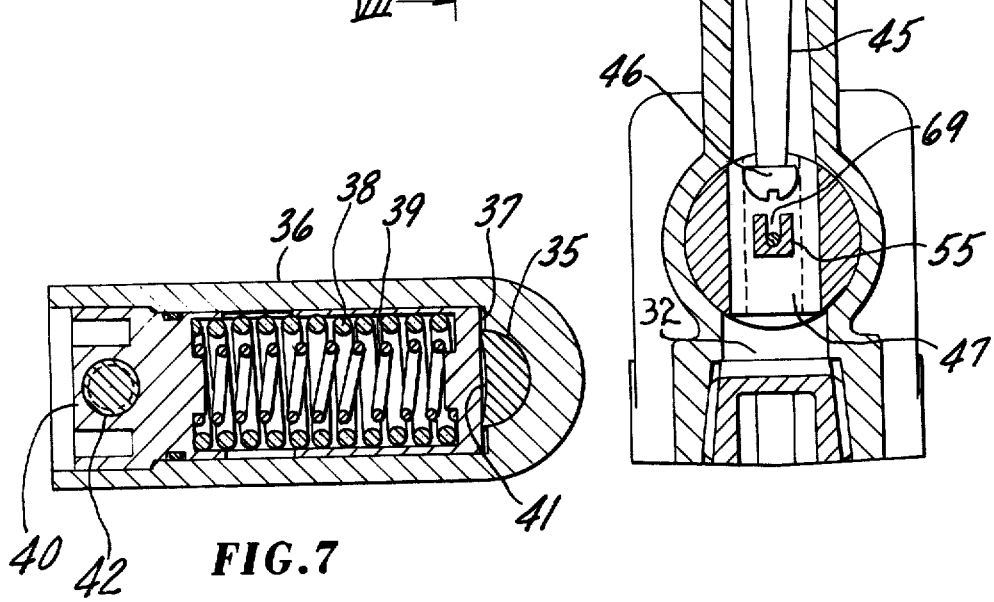
FIG. 7 is a section view along the axis of the over-travel mechanism housed within the exterior lever of the valve.

The piston lands 53,54 of full circumference are of sufficient width in the axial direction as shown in FIG. 5 to cause one of the lands to conform to the full circumference of the cavity 32 in the slightest movement of the time-delay piston 33 out of its neutral position.

A shift of the collar 55 from its neutral position coinciding with the neutral position of the piston by an adjustment of the fitting 18 shortens the time-delay period in movement of the piston 33 in one direction and extends the time-delay period in movement of the piston in the opposite direction.

The time-delay period is attained through provision of the lostmotion relation of the actuating rod 56 with the piston 33 through freedom of movement of the collar within the central piston opening 47 without movement of the piston. In understanding the time-delay function, the collar 55 is best pictured as static since it moves only after expiration of the time-delay period.

Figure 8:
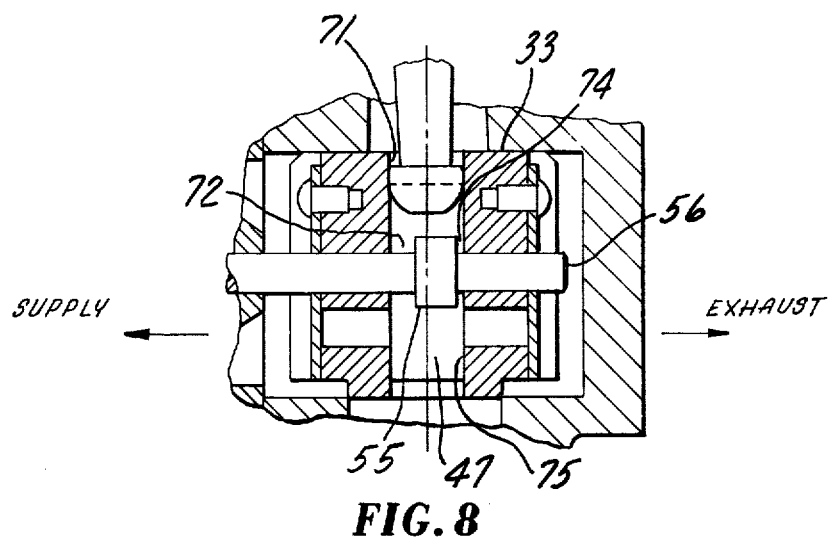
FIG. 8 is a fragmentary sectional view of dashpot mechanism of the valve of the previous figures illustrating one mode of adjustment of the time-delay structure.
Figure 9:
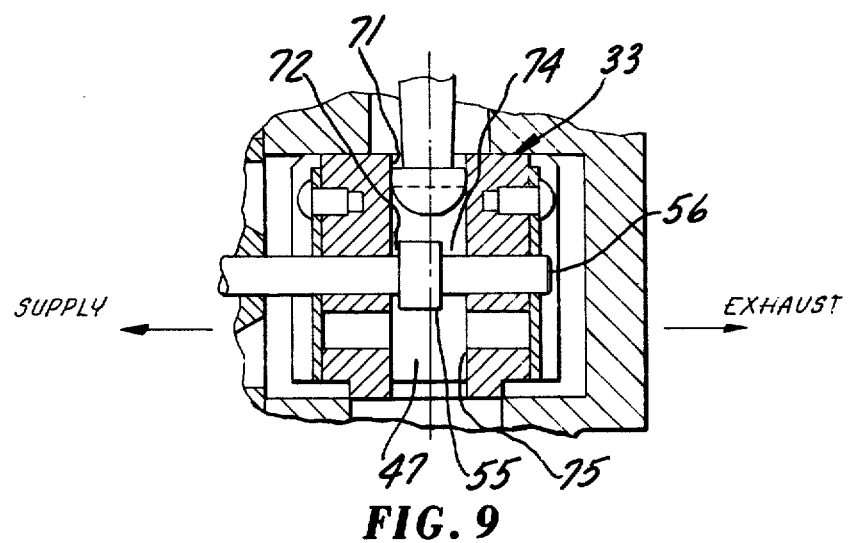
FIG. 9 is a fragmentary sectional view somewhat similar to FIG. 8 showing another adjustment of the time-delay structure.

FIGS. 8 and 9 illustrate two conditions wherein the fitting 18 is manipulated to attain different results. In the case of FIG. 8, the neutral position of the rod 56 and collar 55 is adjusted to the right of the neutral position of the piston 33 to provide a relatively short time-delay period at the end of which the valve acts as shown in FIG. 4 to inflate, e.g., air springs. FIG. 9, on the other hand, illustrates a shifting of the neutral position of the collar 55 leftward of the neutral position of the piston to obtain a relatively long time-delay period for inflation of an air spring, and a relatively short time-delay period until the valve acts in its exhaust function to deflate the air spring.

In the condition of the valve corresponding to FIG. 8, the collar 55 is offset from the center of the piston opening 47 toward the right to cause gap 74 between the collar and an inner piston surface 75 to be smaller than gap 72 between the collar and an inner piston surface 71. Under this condition, piston movement in the direction of "supply" will involve a shorter period of time-delay than movement of the piston from its neutral position in the "exhaust" direction. In the condition of FIG. 9, the converse of the FIG. 8 arrangement is illustrated.

There are two typical conditions in the use of vehicles equipped with valves 5 to which the valve adjustments of FIGS. 8 and 9 apply. The valve adjustment of FIG. 8 is applicable to the situation wherein a vehicle such as a truck is equipped with a height control valve at each corner of the vehicle. It is desired to increase the supporting capacity of the springs on the side of the vehicle at the outside of a curve with respect to the capacities of the springs nearer the inside of the curve. A quick response of the valve to a demand for greater spring capacity is effected by lessening the time-delay period required for the height control valves controlling the springs at the outside of the curve. In order to reduce the hazard of uncontrollable forces acting on the vehicle before the height control valves could heretofore respond with the necessary reinforcement of spring support, the present invention enables individual adjustment of, and tuning of the valves one to the other, to attain higher stability against sway forces on a vehicle.

In recreation vehicles, such as motor homes or trailers, it is desired that the suspension mechanism controlled by the height control system avoid responding to every small shift of load in the fore and aft directions such as momentary walking of a passenger from the front end to the rear end of the vehicle and return. In this situation, gap 74 is increased as shown in FIG. 9 to provide for more movement of the piston to the left to engage the collar 55 to close the gap 74, hence more time lapse prior to actuation of the valve mechanism to cause passage of supply air to the air springs.

In operation, the exhaust condition of the valve as illustrated in FIG. 3 is attained by movement of the lever 8 causing rotation of the shaft 35 and the arm 45 in a counterclockwise direction to cause movement of the piston 33 to the right, whereupon the collar 55 is engaged by surface 71 after the desired lapse of time to carry the actuating rod 56 out of abutting relation with the head 63 of the tube 62. Air then flows from the fluid operated springs through fitting 85 of port 11, cavity 31, and an opening 77 surrounding the left end of the rod 56. The air thereupon passes through the central passageway of the tube 62 and past the check valve 19 outwardly of the fitting 18 until the sprung portion of the vehicle has descended to the level relative to the unsprung portion to shift the lever 8 to a position corresponding to the neutral position of the valve illustrated in FIG. 1. As neutral position is reached, the exhausting of air ceases.

In its function of supplying air to the air springs or air assisted shock absorbers, operation of the valve is illustrated in FIG. 4 wherein the shaft 35 and the arm 45 acting on the piston 33 are shown rotated in a clockwise direction to thrust the piston to the left. The piston carries with it the rod 56 which thrusts leftward on the tube 62 causing the head 63 thereof to be separated and spaced from its seating surface 65. The interior chamber of the sleeve 61 is thus placed in communication with the supply port 15 to allow air to pass through a fitting 79 received in the port 15, a check valve 81 urged against the fitting 79, an annular space 82 surrounding a portion of the cartridge 59 of reduced diameter and through a notch 83 in the wall of the sleeve 61. Air then passes through the interior of the sleeve and the sleeve opening 77 into the cavity 31 and outwardly through the outlet port 11 to a fitting 85 to the air springs. Passage of air continues in this manner until sufficient increase in the spacing of the sprung and unsprung portions of the vehicle has occurred to return the lever 8 and the arm 45 to the neutral condition illustrated in FIG. 1.

The housing portions 21,22 are secured together by a plurality of screws 86, e.g., four screws located at equal arcs along a circumference about the axis A—A. This enables the housing portions to be assembled in a like plurality of positions of relative rotation, of which only one is shown, to render the height control valve more adaptable to actual mounting conditions on a vehicle.

What is claimed is:

1. A height control valve adapted for mounting operatively between a sprung member and an unsprung member of a vehicle, comprising:
   a housing having an inlet port for receiving a supply of fluid under pressure, an outlet port for supplying a fluid to a fluid actuated spring, an exhaust port for discharging unneeded fluid from the valve after passing therethrough from said spring;
   said housing adapted for fixed connection to one of said vehicle members comprising first and second portions through which extends an elongate circular chamber concentric to an axis;
   actuating mechanism housed in said first portion comprising an exterior lever adapted for connection with the other of said vehicle members, a valve-actuating rod located substantially and coaxially within that part of said chamber in said first housing portion, and resilient overtravel means and lost-motion time-delay means for transmitting movements of said lever to said rod;

valve mechanism housed in said second portion comprising a valve assembly independently movable along with said rod as a unit lengthwise of said chamber, said valve mechanism being responsive to axial movement of the rod from a neutral or first position in one direction to a second position providing passage of fluid from said inlet port to said outlet port, and to a third position in the opposite axial direction enabling passage of fluid from said outlet port to said exhaust port;

spring seat means facing toward said exhaust port fixed along, and within, said chamber in spaced relation with the end of said assembly nearer said first housing portion;

spring means positioned between said seat means and said nearer end of said assembly; and thrust means located adjacent the end of the chamber in said second portion further away from said first portion engaging the other end of said assembly and being connected with the second portion in axially adjustable relation therewith to engage said assembly and change the position thereof toward or away from said time-delay means to establish different neutral positions of said rod;

said time-delay means being arranged with respect to said rod to vary the time interval between movement of said lever and responsive movement of said rod in accordance with the neutral position of said rod.

2. The height control valve of claim 1 wherein:

said thrust means is a threaded fitting in threaded relation with said second portion, defines said exhaust port, and comprises check valve means housed therein seating on the adjacent end of said valve assembly.

3. A height control valve for mounting operatively between a sprung member and an unsprung member of a vehicle, comprising:

a housing having an inlet port for receiving a supply of fluid under pressure, an outlet port for supplying a fluid to a fluid actuated spring, and an exhaust port for discharging unneeded fluid from the valve in passing therethrough from said spring;

said housing adapted for fixed connection to one of said vehicle members comprising first and second portions providing an elongate circular chamber formed of coaxial bores of said portions in contiguous relationship, said portions being normally joined together and readily separable along sealed abutting surfaces extending transversely of said bores;

actuating mechanism housed in said first portion comprising an exterior lever adapted for connection with the other of said vehicle members, a longitudinal reciprocable valve-actuating rod located coaxially within the bore of said portion, and resilient overtravel and lost-motion time-delay means for transmitting movements of said lever to said rod;

valve mechanism housed in said second portion comprising a valve assembly independently movable along with said rod as a unit along said bore of said second portion, said valve mechanism being responsive to axial movement of the rod from a neutral or first position in one direction to a second position providing passage of fluid from said inlet port to said outlet port, and to a third position in the opposite axial direction enabling passage of fluid from said outlet port to said exhaust port;

spring seat means facing toward the exhaust port and fixed along, and within said bores adjacent the junction thereof in spaced relation with said assembly;

spring means positioned under compression between said seat means and the near end of said assembly; and fitting means defining said exhaust port located adjacent the end of the bore of said second portion further away from said first portion, said fitting means engaging the other end of said assembly and being connected with the second portion in axially adjustable relation therewith to change the axial position of said assembly toward or away from said time-delay means to establish different neutral positions of said rod;

said time-delay means being arranged with respect to said rod to vary the time interval between movement of said lever and responsive movement of said rod in accordance with the neutral position of said rod.

4. The height control valve of claim 3 wherein:

said fitting means houses check valve means seating on the adjacent end of said valve assembly, said fitting means being exteriorly threaded and in threaded relation with said second portion to effect said connection therewith.

5. The height control valve of claim 3 comprising:

a coupling bushing, said housing portions being recessed axially inwardly from said abutting surfaces to define a recess concentric to said bores receiving said bushing.

6. The height control valve of claim 5 wherein:

said time-delay means comprises the bore of said coaxial double-acting liquid dashpot means therein receiving said rod therethrough in partial lost-motion relationship; and said height control valve comprises sealing means between said bushing and said housing portions, and sealing means between said bushing and said rod providing an anti-leak barrier between said time-delay means and said valve assembly.

7. The height control valve of claim 5 wherein:

said coupling bushing defines said spring seat means.

8. The height control valve of claim 5 wherein:

said valve comprises sealing means between said bushing and said housing portions, and sealing means between said bushing and said rod;

said bushing provides said spring seat means and a second spring seat means facing toward said exhaust port;

said valve comprises third spring seat means fixed to said rod in spaced relation with the second spring seat means, a first spring under compression between said second and third spring seat means urging the rod toward said exhaust port, means defining a passageway surrounding the end of the rod nearer the exhaust port and joining with said outlet port, an exhaust tube supported in coaxial end-to-end normally abutting relation with said rod, said tube being internally open therethrough in communication with said exhaust port but externally sealed with respect thereto, fourth spring seat means fixed on said tube, fifth spring seat means in fixed relation with the second housing portion spaced from the fourth spring seat means toward said exhaust port, a second spring of greater compressive strength than said first spring positioned between the fourth and fifth spring seat means under compression, gas impervious stop means for said tube facing toward the exhaust port and surrounding said passageway arranged for a desired position of abutment of said tube and said rod, and means defining a passageway from the tube end abutting said rod to said inlet port.

9. The height control valve of claim 3 comprising:
a plurality of screws securing said two portions together, said screws being located at equal arcs along a circle concentric to the axis of said bores, said housing portions being thus joinable by said screws in a like plurality of different positions of relative rotation about said axis.

* * * * *